Sept. 23, 1952 P. G. PALMGREN 2,611,669
MULTIROW ROLLER BEARING
Filed Feb. 16, 1948 2 SHEETS—SHEET 1

Inventor:
Per Gunnar Palmgren
by his Attorneys
Howson & Howson

Sept. 23, 1952 P. G. PALMGREN 2,611,669
MULTIROW ROLLER BEARING
Filed Feb. 16, 1948 2 SHEETS—SHEET 2
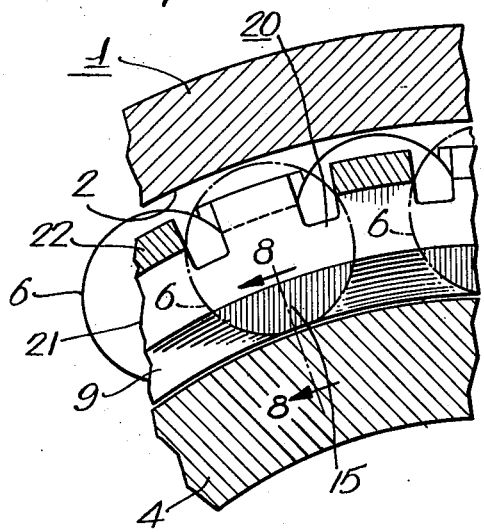
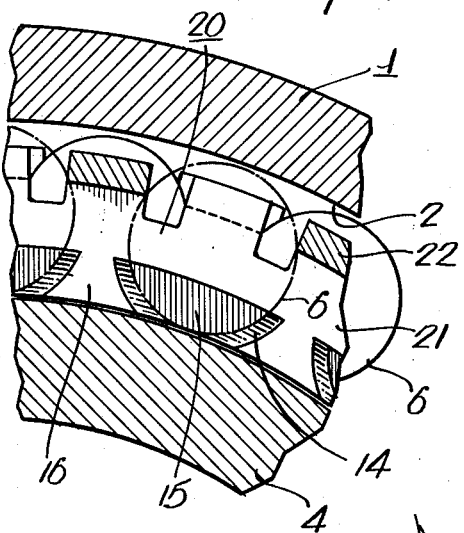
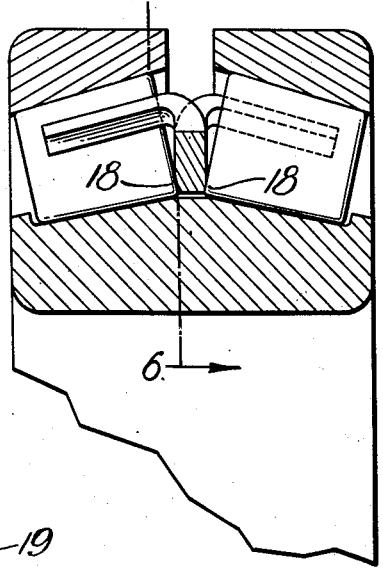
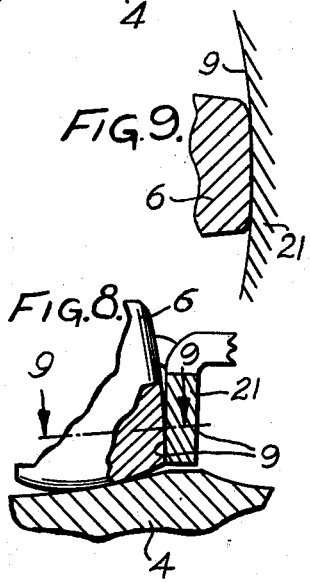
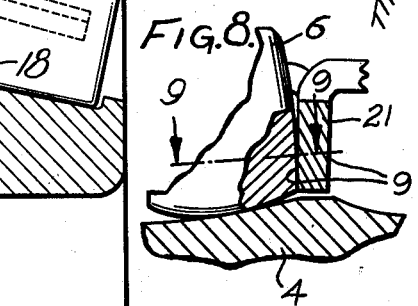
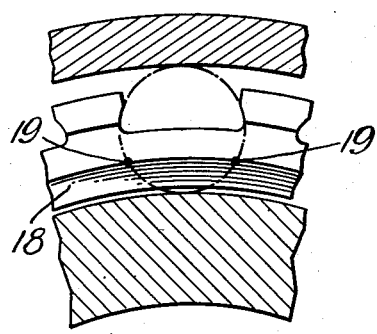
Inventor:
Per Gunnar Palmgren
by his Attorneys
Howson & Howson Patented Sept. 23, 1952

2,611,669

UNITED STATES PATENT OFFICE 2,611,669

MULTIROW ROLLER BEARING

Per Gunnar Palmgren, Philadelphia, Pa., assignor to SKF Industries, Inc., Philadelphia, Pa., a corporation of Delaware Application February 16, 1948, Serial No. 8,491

9 Claims. (Cl. 308—213)

My invention relates primarily to improvements in roller bearings having two rows of rollers, and has for its principal object the saving of material and manufacturing costs by the elimination of present-day flanges or separate rings for guiding the rollers and/or for taking up roller end thrust.

My invention applies with particular suitability to two-row bearings having rollers with curved profiles and wherein the axes of the rollers in each row intersect at one point on the bearing axis. Previously, these bearings were designed so that the load from the outer race was directed onto the rollers at an angle different from the corresponding reactionary force of the inner race, so as to produce a positive thrust toward the large, inboard, end of the roller. To support this thrust a thrust surface was provided in that location. This deliberately induced thrust load was used to keep the rollers in alignment in a manner familiar to the anti-friction bearing art.

The aforesaid thrust surfaces are of two types: (1) a flange at the middle of the race, or (2) a separate ring fitted with running clearance within the outer race or around the inner race. Nearly all of such bearings have a flange integral with the inner race. Most of the remainder use a separate ring running loosely within the outer race. These thrust surfaces must possess close dimensional accuracy in order to keep the rollers in alignment with the bearing axis or as bearing engineers say, to "guide" the rollers correctly. Such accuracy comes only by careful setting up and grinding. In the case of the flange, it requires separate operations on machines designed for just that one job. In the case of the ring another type of specific machine is required as well as fixtures and other expensive accessories. Obviously elimination of these thrust supporting parts will save: first, a lot of material, because the tubing or bar from which the inner race is cut must have a larger diameter than the inner race flange; second, the special turning and grinding machines; and third, the additional operations of turning and grinding the surfaces.

These valuable results are achieved in the present invention by providing a novel one-piece retainer, or cage, enclosing both rows of rollers and capable not only of circumferentially spacing the individual rollers, but also of taking up the pressure from both of the inboard ends of the rollers so that the pressure from one reacts the pressure from the other. My invention resides in placing a thrust surface on each of the two opposite sides of the body portion of the cage.

Figure 4 is a sectional view as though taken on the line 4—4, Fig. 1, but illustrating a modification within the scope of the invention;

Figure 5 is a cross sectional view of a bearing having tapered rollers;

Figure 6 is a fragmentary sectional view on the line 6—6, Fig. 5;

Figure 7 is a sectional view corresponding to Fig. 2, but illustrating a further modification within the scope of the invention;

Figure 8 is a fragmentary sectional view on the line 8—8 of Figure 7, and

Figure 9 is a section on the line 9—9 of Figure 8.

Figure 1:
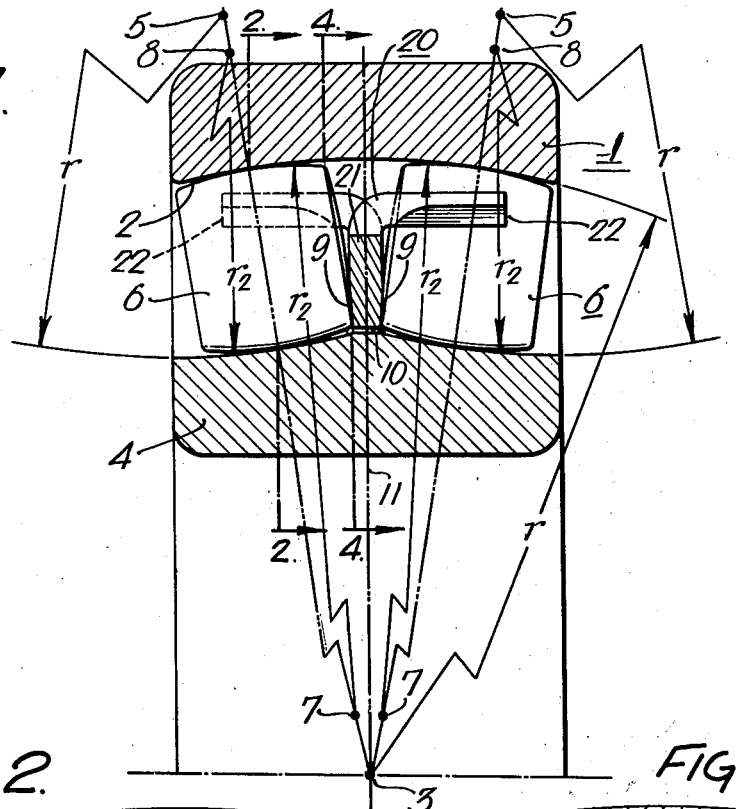
Figure 1 is a cross sectional view of a bearing containing two rows of rollers between two race rings and made in accordance with the invention.

Figure 1 shows a form of anti-friction bearing which I have found suitable for practice of my invention. In this bearing 1 represents an outer ring having a raceway 2 formed as a sphere of radius $r$ swept around the bearing center 3. 4 represents an inner raceway having two grooves formed by turning, around the bearing axis, two arcuate elements of radius $r_1$ whose centers lie at 5, 5 respectively on extensions of the lines from the bearing center to the middle points of the respective rollers and their contacts with the inner and outer raceways. In the present instance the radii $r$ and $r_1$ are equal in length. 6, 6 represent rollers having arcuate surfaces formed by turning around the roller axis arcs of radius $r_2$ slightly less than $r$ and $r_1$. Intermediate the two rows of rollers 6, 6 is a cage indicated by the reference numeral 20 and consisting of a generally flat ring 21 the bore of which is formed to closely embrace the inner race ring 4 at its axial mid-section 10 and which has at its outer periphery oppositely projecting fingers 22 which in assembly lie between and act as spacers for the rollers 6, of both rows. In accordance with the present invention the cage 20 is made to function also as an effective medium for holding the rollers 6 in substantially perfect alignment in the bearing, as hereinafter set forth.

In the bearing assembly the centers of the roller profiles lie at 7, 7 near point 3, and 8, 8 near point 5 on the lines 3—5 and thus secure contact at the middle points of the inner race grooves. Since the roller profiles have shorter radii than those of the races, all contacts will be points on the radial line passing through the middle points of the roller, the inner raceways and the bearing center, when the bearing carries no load. As well established in the anti-friction bearing art, the contacts will become elliptical surfaces surrounding the previous points as soon as the bearing is called upon to carry load. Under radial load on the bearing and with the construction just outlined, the outer race through its contact ellipses, will impose load on the rollers at all points directed perpendicularly to the surfaces in contact, that is toward point 3 at the center of the bearing. Since the centers of curvature of the inner races and roller profiles lie on the same radial line at points 5 and 8 respectively, the line of inner race reaction will coincide with the line of outer race action so that the rollers will be kept in equilibrium in the middle of the raceways, under radial load, and I have found that they will travel around the bearing continuously in the same path or nearly so.

The raceways contact the rollers over extensive elliptical surfaces which curve very flatly in the axial direction. In the circumferential direction, the outer raceway turns toward, or wraps around the rollers while the inner raceway turns away from the rollers. In the turning aside, or skewing, therefore, the rollers will meet only frictional resistance from both raceways.

Figure 2:
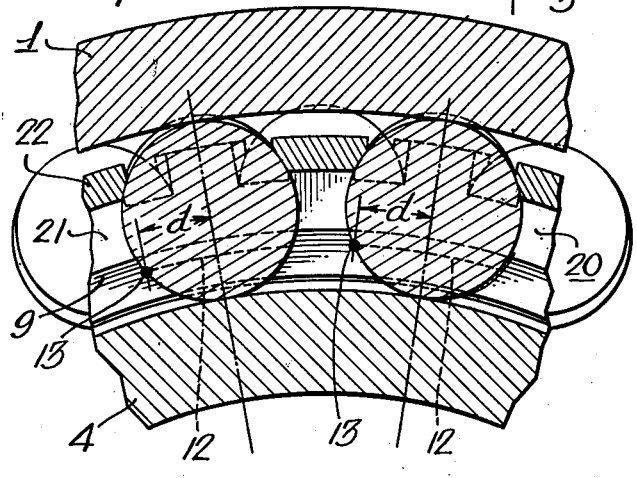
Figure 2 is a sectional view on the line 2—2, Fig. 1.
Figure 3:
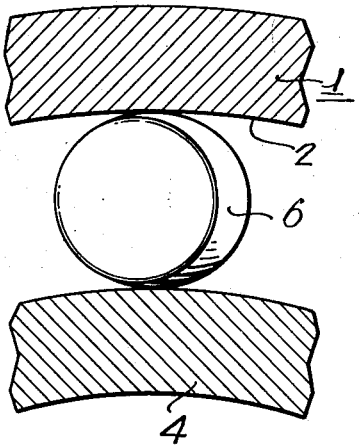
Figure 3 is a schematic fragmentary sectional view taken along the axis of one of the roller elements.

Figures 1 and 2 illustrate the manner in which the rollers are held in substantially perfect alignment by the inner part of the cage body as formed according to my invention, which substantially prevents them from skewing; Figure 3 shows one of the rollers turned aside or skewed as it would be if free from the guiding effect of the cage. In this view the clearance at the roller ends and the amount of skewing appears on a greatly exaggerated scale for the purpose of making this roller movement clear. Actually only a slight displacement would occur.

Due to the substantial axial extent of the loaded contact surfaces, the distances of the various points thereof from the bearing axis about which the moving raceway rotates, will vary and will therefore tend to impart uneven rates of speed to the rollers at different locations. As a net result, one race may tend to drag one end of the roller down through the plane of the paper while the other race tends to drag it up. Rarely would these tendencies offset each other and so the rollers will always tend to skew to an unpredictable degree off their natural position in which position all roller axes intersect at one point on the bearing axis. To support such loads as may occur due to this skewing tendency, and to keep the rollers travelling smoothly and continuously in the same path throughout every revolution, I have provided the thrust-supporting surfaces 9 on each of the opposite sides of the ring portion 21 of the cage body.

In many present-day bearings, it is customary to use the sides of cage pockets, formed to fit the roller closely, as a means for guiding the rollers, or keeping them in alignment. But the sides of the cage pockets will vary in position relatively to the profile surfaces of the rollers: first, because the diameter of the circle of roller centers will vary many thousandths of an inch, between a minimum and maximum due to the common practice of fitting a small or a large inner raceway to a correspondingly small or large outer raceway; and secondly, to a lesser degree, when the inner race expands to accommodate the various requirements of bore and fit tolerances, and the degrees of fit interference desired for different applications. These conditions make close control of roller guidance by cage pockets impossible. In the instant device, the above variations will change the location of my thrust surfaces less than about 15% of the amount by which they change the relative location of the rollers in the aforesaid pockets. Variation in the position of the rollers in the pockets takes place in the radial direction proportional in amount to the cosine of the angle of inclination of the thrust surface with the central plane of the bearing, contrasted with variation in the position of my thrust surface which takes place in the axial direction proportional in amount to the tangent of the same angle. Therefore, the axial movement of my thrust surface as compared with the radial movement of the roller is equal to tan/cos of this small angle, which will usually be in the neighborhood of 8°. For an 8° angle, the aforesaid variations will affect the location of any guiding surface only $\frac{1}{7}$ as much as that of the rollers in the aforesaid cage pockets. Consequently, my invention will control roller guidance with much geater precision than roller guidance by pocket fit. I produce these surfaces 9 with great accuracy by swaging in a proper combination of punch and die and position them correctly in the bearing by forming the bore of the cage to fit with slight clearance over the middle part 10 of the inner race.

In the drawings I have shown conical thrust surfaces on the cage body, these being generated by rotating around the bearing axis, straight lines set to make small angles with the central plane 11 of the bearing. The inboard roller end has a spherical surface of long radius such as the distance along the roller axis from that end to the intersection of the roller axis with the bearing axis. The roller end therefore contacts the thrust surface throughout the circular line 12, 12, Figure 2. If the roller should skew it would turn around the line 3—5 which passes through the centers of the contact ellipses. At these centers the greatest intensity of pressure exists, as disclosed by Hertz in his treatise on the contact of elastic bodies under load, and as well established in the anti-friction bearing art. Depending upon the direction of skewing, one edge or the other of the roller end, will press against the adjacent cage body, as at point 13, Figure 2. The reactionary forces from the cage will tend to prevent the roller from turning. These forces will prove effective in proportion to their distances $d$ in the plane of the paper, from the line 3—5, and therefore I place the contact line as near to the roller axis as practicable. This secures a good length for $d$.

It would be possible to grind a flat surface on the roller end, in which case it would contact the cage surface, similarly to the above, at two points at the roller edge, situated nearly in the same relative position as those at the end of the circular contact. This two point contact is illustrated in Figs. 5 and 6, for example, in connection with a roller bearing of the tapered roller type. In this case the roller ends are plane surfaces and will contact the conical thrust surfaces 18 at the points on the edge of the roller end indicated at 19, 19 in Fig. 6. I could also produce a good effect by swaging on the cage body spherical thrust surfaces to match the spherical roller ends, instead of the conical surfaces described above, in which case the roller ends would contact the surfaces over a substantial spherical area, as shown in Figs. 7, 8 and 9. With this construction the righting forces will act over a small area near one edge of the roller end and will thus have an effect substantially equivalent to that of two spaced points.

It would be possible also to swage on that portion of the cage body in the region of the roller end, a localized area 14, see Fig. 4, having any form desired either to match a duplicate form, or to cooperate with some dissimilar form on the roller end, which may be found advantageous. In diagrammatic Figure 4, I have shown such a localized area 14 impressed upon the cage body to match the roller end. The shaded area 15 indicates contact over the whole of that portion of the roller end which contacts the cage body. The two surfaces may have plane, spherical, elliptical, or any other surface found useful, or may differ as described above. The space 16 between these localized areas never touches the roller ends and so may have any shape convenient to the manufacture of the cage.

Under some severe loading conditions, I have found that wear takes place on portions of the cage body guiding surface, and in bearings to be used for such service, I install cages made of steel possessing enough carbon to provide a satisfactory hardness by heat treatment. These hardened surfaces withstand greater thrust loads without suffering indentation and possess much longer useful life without abrasion.

All of the previously mentioned curved rollers when unloaded had point contacts with both races, because of slightly sharper curvatures on the rollers than on the races. As now manufactured a large number of these bearings have inner race radii matching that on the roller, which produces contact along a line from end to end of the inner race. With the outer race contact at the center of the roller, the line of action of the outer race loads will coincide with the resultant of the reactionary supporting forces, which passes through the central point of the inner race, normal thereto. With such a construction, the loads on the lower portion of my cage will be relatively light and correspond in action with those described above for point contacts between rollers and both races. However, when using line contact on the inner race, the center of the inner race curvature is usually made to lie in the inboard direction, off the line joining the center of the outer raceway sphere (bearing center) and the point of roller contact with the outer race, being located thus to produce a positive thrust toward the inboard end of the roller, in the same manner as in tapered roller bearings of the type shown in Fig. 5. Thrust loads on my cage will therefore correspond in action with those from the tapered roller. Hardness of the cage body procured by heat treatment will add to its useful life under such loads.

I claim:

1. In a roller bearing, inner and outer members having confronting roller races and rows of rollers operating on said races, and a cage having separator elements for the rollers of both rows and a portion intermediate said rows constituting a thrust bearing for said rollers, said intermediate portion extending radially into proximity to the said inner member and being formed so that contact between the rollers and said intermediate portion shall be confined to the area of said portion adjoining the inner member.

2. In a roller bearing, inner and outer members having confronting roller races and rows of rollers operating on said races, and a cage having separator elements for the rollers of both rows and a portion intermediate said rows constituting a thrust bearing for said rollers, each said roller engaging the intermediate portion of the cage at points at or near the peripheral edge of the proximate roller end.

3. A roller bearing according to claim 2 wherein the said thrust surfaces are conical in form and wherein further the ends of the roller contacting said surfaces are spherically shaped.

4. A roller bearing according to claim 2 wherein the thrust surfaces and the surfaces of the roller ends contacting said thrust surfaces are spherically shaped on equal radii.

5. A roller bearing according to claim 1 wherein the end of each individual roller contacts the thrust surfaces at points remote from a plane containing the axis of both the roller and the bearing.

6. A roller bearing according to claim 1 wherein the thrust-bearing portion of the cage extends radially with respect to the bearing axis and the separator elements extend generally in the axial direction from the outer peripheral area of the said radial portion.

7. A roller bearing according to claim 6 wherein the thrust-bearing surfaces reside in the inner peripheral area of the said radial portion.

8. A roller bearing according to claim 6 wherein the axes of the rollers of each row define a theoretical cone having its apex located in the bearing axis at a point remote from the proximate side of the bearing.

9. A roller bearing according to claim 1 wherein one of the raceways of the bearing defines the surface of a sphere and wherein further the rollers exhibit curved profiles.

PER GUNNAR PALMGREN.

REFERENCES CITED

The following references are of record in the file of this patent:

UNITED STATES PATENTS

| Number | Name | Date |
| --- | --- | --- |
| 1,096,530 | Hess | May 12, 1914 |
| 1,283,714 | Fjellman | Nov. 5, 1918 |
| 1,350,263 | Palmgren | Aug. 17, 1920 |
| 1,689,505 | Styri | Oct. 30, 1928 |
| 2,034,566 | Fernstrom | Mar. 17, 1936 |

FOREIGN PATENTS

| Number | Country | Date |
| --- | --- | --- |
| 101,021 | Great Britain | Sept. 27, 1917 |
| 384,430 | Great Britain | Dec. 8, 1932 |
| 53,856 | Sweden | Nov. 29, 1918 |
| 29,413 | Norway | Feb. 3, 1919 |
| 97,274 | Austria | June 25, 1924 |